United States Patent [19]

Kazin

[11] 4,049,074

[45] Sept. 20, 1977

[54] SOUND-ATTENUATING INLET DUCT

[75] Inventor: Stephen B. Kazin, West Chester, Ohio

[73] Assignee: General Electric Company, Cincinnati, Ohio

[21] Appl. No.: 577,293

[22] Filed: May 14, 1975

[51] Int. Cl.² ............... F04B 39/00; B64D 33/06
[52] U.S. Cl. ................................... 181/286; 181/284
[58] Field of Search .......... 181/33 HA, 33 HB, 33 H, 181/33 E, 47 B, 50; 415/119; 137/15.1

[56] References Cited

U.S. PATENT DOCUMENTS

| | | | |
|---|---|---|---|
| 2,763,426 | 9/1956 | Erwin | 181/33 HA |
| 3,508,838 | 4/1970 | Martenson | 181/33 HA |
| 3,532,129 | 10/1970 | Ward et al. | 181/33 HA |
| 3,542,152 | 11/1970 | Adamson et al. | 181/50 |
| 3,692,141 | 9/1972 | Labussiere et al. | 181/33 H |
| 3,702,220 | 11/1972 | Medawar et al. | 181/33 HA |
| 3,765,623 | 10/1973 | Donelson et al. | 137/15.1 |

Primary Examiner—Stephen J. Tomsky
Attorney, Agent, or Firm—Robert C. Lampe, Jr.; Derek P. Lawrence

[57] ABSTRACT

A sound-attenuating inlet duct is provided for a gas turbine engine wherein the inlet duct includes a casing defining, in serial flow relationship, a minimum area throat of predetermined axial extent, a diffuser and a cylindrical section. Sound-absorbent acoustic material is disposed upon the inner walls of the duct in the cylindrical section. A first amount of acoustic attenuation is provided by accelerating the motive fluid to high subsonic velocities through the throat. A second amount of acoustic attenuation is provided by locally accelerating the motive fluid in the vicinity of the acoustic material, thereby imparting a velocity component to the acoustic waves which is normal to the acoustic material, thereby enhancing absorption. By sizing the various sections of the inlet duct in a unique predetermined relationship the effects of the two sources of acoustic attenuation may be made additive.

5 Claims, 6 Drawing Figures

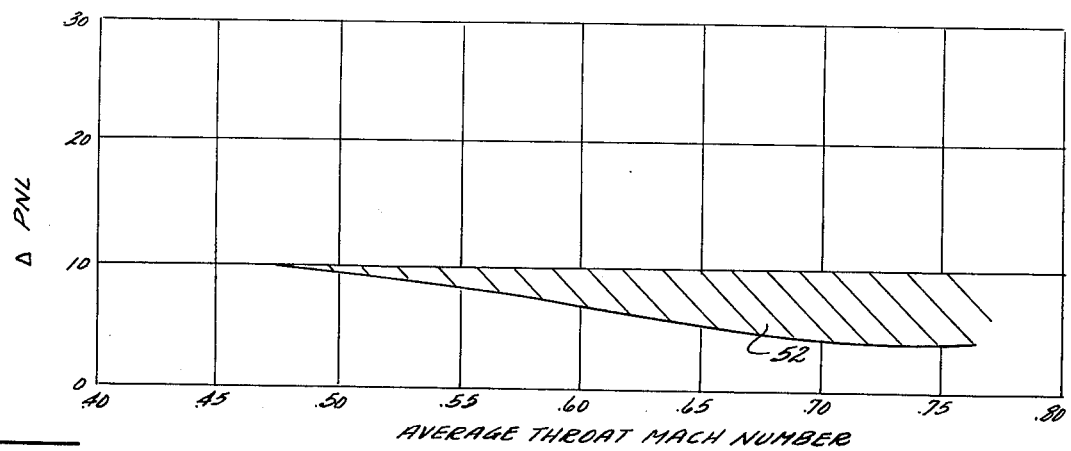
Fig 3
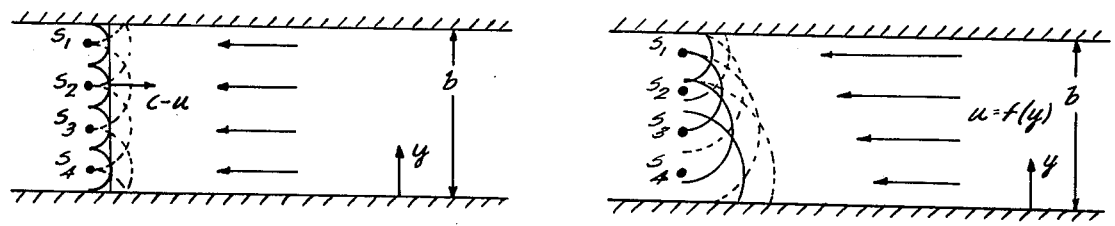
Fig 6
Fig 5

SOUND-ATTENUATING INLET DUCT

BACKGROUND OF THE INVENTION

As Federal noise level standards for gas turbine engines become more stringent, the designer of such engines is faced with the problem of reducing noise in an efficient, cost effective manner.

Gas turbine engine noise is generated from two primary sources. First, there is that associated with the viscous shearing of rapidly moving gases exhausted into the surrounding atmosphere. In turbofan aircraft engines, such gases are emitted from the fan and core nozzles at the rear of the engine. Various approaches have been utilized to reduce this shear noise, most approaches incorporating mixers to co-mingle fan and exhaust gases with each other and with the surrounding environment.

The second source of noise, and the one to which the present invention is directed, is generated by the rotating turbomachinery itself. This results from the relative motion between the rapidly rotating blade rows and the interflowing gas stream. The noise is affected by such parameters as blade rotational speed, blade-to-blade spacing, blade geometry, and by the proximity of stationary hardware to such rotating blade rows, as in the case of an outlet guide vane arrangement. Another example of the latter condition occurs in typical multistage axial compressors where stationary blade rows are alternated with rotating blade rows. Some of the noise generated in this manner can be absorbed and suppressed by means of acoustic or sound-absorbing paneling disposed about the periphery of the nacelle enclosing the rotating turbomachinery. Such sound absorbing material is well known in the art. However, because of the close proximity of the fan or compressor to the inlet frontal plane, and the lack of acoustic shielding in the forward direction, a significant percentage of noise propagates forward from the gas turbine inlet duct.

Prior attempts to solve this problem have concentrated on the application of sound-absorbing material to the inlet duct inner walls. This does little to attenuate unreflected noise propagating in the axially forward direction. Additional benefits have been obtained by providing coaxial, circumferential rings of sound-absorbant material within the inlet. However, such rings produce a loss of inlet total pressure and, therefore, bring about performance losses which remain throughout the engine operating envelope even when noise propagation presents no hazard or nuisance to inhabitants below. Another disadvantage is that anti-icing provisions must be made. Such a structure increases the potential for foreign object damage, decreases accessibility to the fan rotor on the flight line and increases weight.

Another concept incorporates an axially translating noise deflector on the bottom of the inlet duct to selectively reduce the downward transmission of noise from the inlet. However, this configuration is inadequate for two reasons. First, it has been shown that an inlet incorporating such a deflector may have a poor pressure recovery characteristic (i.e. it is inherently a high-loss system) depending upon its shape. Secondly, and somewhat related to the foregoing problems, is that the total pressure pattern may become highly distorted, as for example in the plane of a gas turbine fan stage disposed within the duct. While the poor pressure recovery results in degraded engine performance, the distorted flow pattern may, under certain conditions, cause excessive fan blade stresses and possible destruction of the rotating turbomachinery.

Yet another approach which has recently been investigated is to accelerate the inlet flow such that the average Mach number at the throat is 1. The principle employed is that an acoustic wave cannot propagate upstream against a Mach 1 flow since the wave itself can only travel at Mach 1. This, however, presents some performance problems. For application of this concept to conventional aircraft, a considerable amount of inlet area variation is required because of the large variation in air flow with engine power setting. Further, the inlet length must be increased considerably due to the necessity of diffusing from Mach 1 to an acceptable fan rotor plane Mach number without boundary layer separation in the inlet. Additionally, recent tests have shown that there is a serious loss of noise suppression when a choked inlet is subjected to inflow at various angles of attack within the normal take-off and landing range.

Prior attempts to combine the acoustic benefits of a choked, or near-choked, inlet with those of the sound-absorbing material have been disappointing in that the system was no more effective than that of the choked inlet alone.

The problem facing the gas turbine designer is, therefore, to provide a means for attenuating noise emanating from the duct without incurring excessive complexity, cost or performance penalties.

SUMMARY OF THE INVENTION

Accordingly, it is the primary object of this invention to reduce noise emanating from within a duct without sacrificing overall performance.

It is another object of the present invention to effectively combine the acoustic benefits of a high subsonic Mach number inlet throat with the noise suppressing qualities of known sound-absorbent materials.

It is yet another object of the present invention to provide an improved method of reducing noise emanating from the gas turbine engine.

These, and other objects and advantages, will be more clearly understood from the following detailed description, the drawings and specific examples, all of which are intended to be typical of rather than in any way limiting to the present invention.

Briefly stated, the above objectives are attained by providing an inlet duct with a throat, a diffuser and a cylindrical section in serial flow relationship ahead of the fan rotor. Sound-absorbent material is disposed upon the walls of at least the cylindrical portion. A first amount of acoustic attenuation is provided by accelerating the flow to high subsonic velocity at the throat. A second amount of acoustic attenuation is obtained by locally accelerating the motive fluid in the vicinity of the acoustic material, thereby imparting a velocity component to the acoustic waves which is normal to the acoustic material thereby enhancing absorption. By sizing the various sections of the inlet duct in a unique, predetermined relationship, the effects of the two sources of acoustic attenuation may be made additive.

While this invention will aid in inlet noise suppression, more significant is that it will accomplish this suppression without substantial performance degradation, without any moving parts and with a minimum impact on cost.

Further, limits have been established for the geometry of the inlet within which maximum noise attenuation will result, and beyond which noise attenuation improvement is offset by increased inlet duct length and weight.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 3 is a graphical representation of acoustic effectiveness of the sound-absorbent material of FIG. 2 as a function of average throat Mach number;

FIG. 5 is a graphical representation of the acoustic effectiveness of various inlet duct configurations; and FIG. 6 is a diagrammatic representation of the mechanism of acoustic wave turning.

DESCRIPTION OF THE PREFERRED EMBODIMENT

Figure 1:
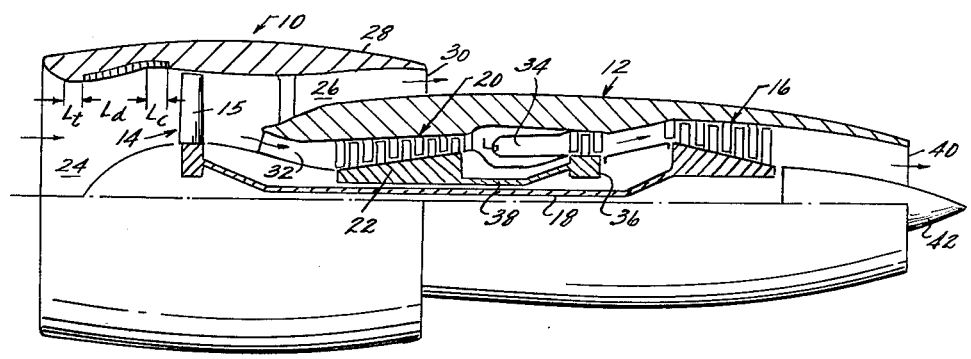
FIG. 1 is a side view in cross section of the gas turbine engine incorporating the present invention.

Referring to the drawings wherein like numerals correspond to like elements throughout, reference is first directed to FIG. 1 wherein an engine depicted generally at 10 embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of this compressed air enters the fan bypass duct 26 defined, in part, by core engine 12 and a circumscribing fan nacelle 28 and discharges through a fan nozzle 30. A second portion of the compressed air enters inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting to the invention, as it will become readily apparent from the following description that the present invention is capable of application to any device passing flow therethrough and having noise emanating from within, and is not necessarily restricted to use with a gas turbine engine as depicted. The foregoing description of the operation of the engine depicted in FIG. 1 is, therefore, merely meant to be illustrative of one type of application.

As previously discussed, one method for reducing noise propagating forward out of the inlet of, for example, a gas turbine engine is to accelerate the inlet flow such that the average Mach number at the throat is 1 (sonic). One such scheme is fully disclosed in U.S. Pat. No. 3,611,724 — J. T. Kutney, assigned to the assignee of the present invention, and provides for an inflatable diaphragm at the inlet throat to vary the cross-sectional area at the throat as a function of the engine operational mode. The addition of variable geometry to the engine inlet, while solving some of the problems mentioned previously, provides for increased weight and cost, and complicates the engine design.

A second previously discussed method of reducing engine noise is by the application of sound-absorbent material to the inlet duct inner walls. This technique is now well known in the art of acoustics, one such scheme being fully disclosed in U.S. Pat. No. 3,542,152 — Adamson et al, which is also assigned to the assignee of the present invention.

Figure 2:
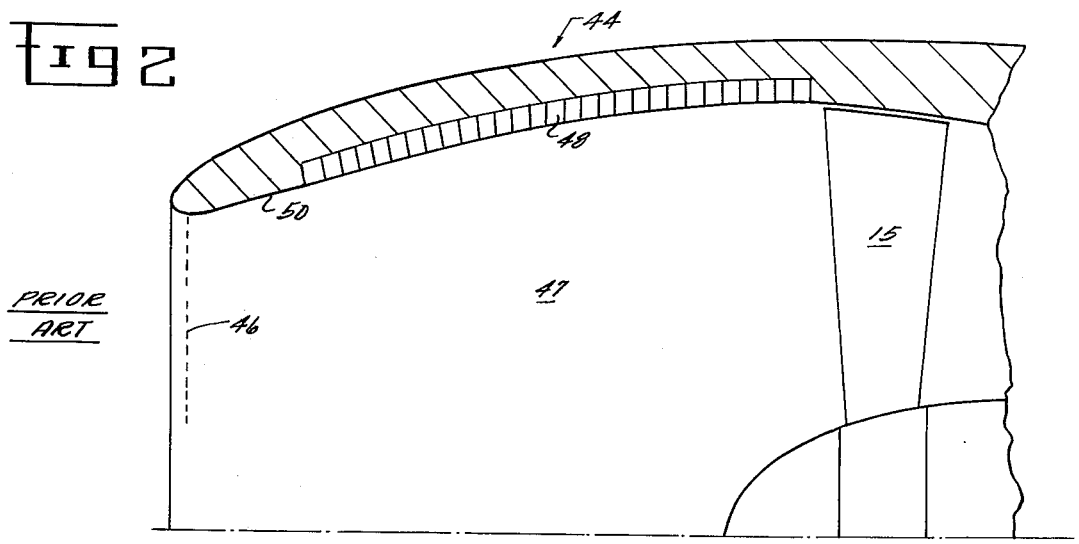
FIG. 2 is a cross-sectional, schematic representation of a prior art gas turbine inlet duct incorporating sound-absorbent material.

While the concepts of accelerating the inlet flow to sonic or near-sonic velocities, and treating the inlet with sound-absorbing material have been previously found to be individually effective, combining the two effects has produced a reduction in noise level which is significantly less than the sum of the parts. In other words, the two effects were not acoustically additive. FIG. 2 schematically depicts a typical prior art gas turbine engine inlet duct 44 having a throat 46 defined at the singular point of minimum cross-sectional area with the flow path 47 area diffusing or increasing, to the plane formed by the leading edge of the fan blades 15. Sound-absorbent material 48 of a known variety is disposed upon the duct inner wall 50. However, this type of design results in considerable degradation of the sound-absorbent material suppression effectiveness. FIG. 3 is typical of the results of the flows accelerated through such an inlet and represents graphically the reduction in perceived noise level ($\Delta$PNL) as a function of average throat Mach number. It is obvious that the shaded area 52 represents the decrease in effectiveness of the system as the average throat Mach number is increased above a value of approximately 0.45.

Figure 4:
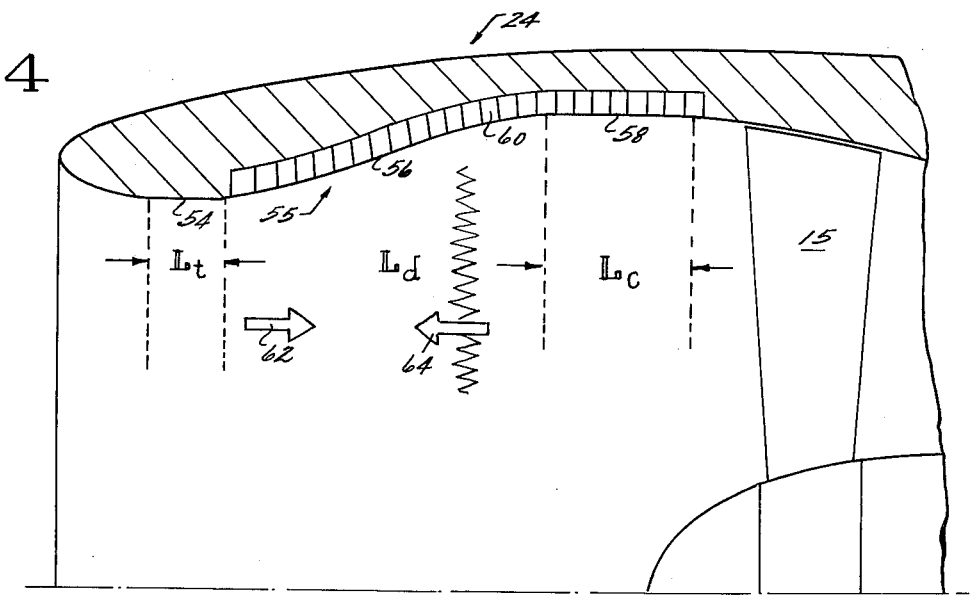
FIG. 4 is an enlarged view, similar to FIG. 2, of the inlet portion of the gas turbine of FIG. 1 and depicting various geometric characteristics.

The foregoing deficiency is avoided when an inlet duct 24 such as that depicted in FIG. 4 is used. In this inlet the throat 54 is elongated. In other words, the duct casing wall 55 maintains a constant diameter for a predetermined axial extent $L_t$ which, as will be shown hereinafter, is preferred to be a function of the average throat Mach number. Diffusion is accomplished as rapidly as possible through a diffuser 56 of axial length $L_d$, which also is a function of the average throat Mach number, and a cylindrical section 58 of axial extent $L_c$ is added ahead of the fan blades 15.

The inclusion of sound-absorbent material 60 in this inlet in combination with high average Mach numbers creates a useful and unique hybrid inlet which has the properties of both its constituents and some unique characteristics of its own.

FIG. 5 graphically represents the reduction in perceived noise level as a function of average throat Mach number for an accelerating inlet such as that of FIG. 4. Without sound-absorbent material 60 installed upon the duct inner walls (curve A), it is apparent that there is little noise reduction due to inlet flow acceleration below Mach numbers of approximately 0.6, while at Mach numbers above 0.6, curve A depicts the noise attenuation due to acceleration effects alone. Test data scatter is represented by the cross-hatched area surrounding curve A.

However, when the sound-absorbent material 60 is included, there is an added acoustic attenuation effect at all Mach numbers (curve B) up to a Mach number of approximately 0.8 where the data scatter of curves A and B appear to overlap. The difference in noise attenuation between curves A and B represents the absorbent material suppression effectiveness and, if plotted, would have a trend similar to FIG. 3. In other words, at the higher Mach numbers curves A and B tend to merge due to the loss of effectiveness of the sound-absorbent material, and the inlet acoustic performance tends to approach that of a purely untreated accelerating inlet. However, at lower Mach numbers the inlet of FIG. 4 has as its basic suppression capabilities those of an accelerating inlet with the added effectiveness of sound-absorbent material treated walls.

The reason for the unique performance of the inlet of FIG. 4 is a careful combination of increased acoustic wave resonance time in the inlet duct and the refraction of acoustic energy toward the sound-absorbent material.

The resonance time is associated with the increased number of wave lengths through which the acoustic energy is required to traverse before the sound emerges from the inlet. Shortened wave lengths result because the inflow against acoustic propagation retards the acoustic wave's progress. In other words, as the flow represented by vector 62 (FIG. 4) is accelerated against the direction of acoustic wave propagation represented by vector 64, the effective wave length decreases by the factor $(c-u)/c$ where $c$ is the speed of sound and $u$ is the flow velocity. Thus, the sound absorbent material has a longer time to operate on the acoustic energy. Further, it is important to consider the axial and radial extent of the accelerated flow region in the inlet with due consideration to maintaining internal aerodynamic stability. Thus, at lower Mach numbers it is preferred to increase the axial extent of the accelerated flow region while at higher Mach numbers, the axial extent of the throat may be diminished.

The second phenomenon being exploited involves the refraction of acoustic waves in the inlet due to radial flow velocity gradients. If the inlet wall geometry is carefully chosen, it will cause the axial flow velocity at the wall (approximately sonic) to exceed that at the inlet centerline. Thus, the acoustic waves tend to travel faster in the center of the inlet duct (i.e., $c-u$ is a larger value) than along the wall. The effect is then a turning of the acoustic waves toward the casing wall 55 resulting in a more normal impact of the wave upon the wall. The normal absorption coefficient for most sound-absorbing material is higher than the grazing coefficient. Therefore, greater acoustic absorption is obtained.

The effect of acoustic wave turning may be demonstrated by the following example in connection with FIGS. 6a and 6b. Consider the four point sources $S_1$, $S_2$, $S_3$ and $S_4$ of FIG. 6a radiating upstream in a duct against a constant inflow of velocity $u$. Each source radiates relative to the duct at a velocity $(c-u)$. Thus, the locus of points connecting each wave (depicted in phantom) results in a straight line perpendicular to the inflow. That is, the wave front propagates along the duct at a velocity of $(c-u)$.

In FIG. 6b, the same four sources propagate against a non-uniform flow which, for the purposes of this example, is a function of the duct height $y$. In other words, $u$ = $f(y)$. Source $S_1$ propagates more slowly than the remaining sources since $(c-u)$ is a smaller quantity. Thus, the locus of wave fronts is a line leaned relative to the wave front of FIG. 6a. In the limit, if the velocity at the wall ($y = b$) is equal to the speed of sound, $c$, the wave front would pivot about and turn directly into that wall. Generally, however, the turning is gradual as the wave propagates down the duct. This is manifested by a radial component of velocity which causes the normal impact and absorption at the treated wall.

However, to obtain the aforementioned benefits, it is necessary to get the flow acceleration over with as fast as possible in order to avoid losing sound-absorbent material effectiveness as illustrated by FIG. 3. Therefore, the diffusion must be accomplished as rapidly as possible without causing inlet flow separation. Accordingly, as the design point average throat Mach number increases, diffuser length $L_d$ must also increase to avoid flow separation for a given fan blade 15 leading edge plane Mach number.

Through testing it has been discovered that the optimum axial extents $L_t$ and $L_d$ for the throat section 54 and diffuser section 56, respectively, may be expressed as a function of fan blade 15 tip diameter or cylindrical section diameter D and the design throat average Mach number M as follows:

$$L_d/D = 2.6 M - 1.12, \qquad (1)$$

and $$L_t/D = 1.28 - 1.6 M, \qquad (2)$$

where $$0.7 \leq M \leq 0.8$$

Though these equations represent optimum configurations, deviations of as much as 10% from these values would not significantly impair acoustic performance.

The limitation on the average throat Mach numbers to values substantially between 0.7 and 0.8 is based on several factors. As shown in FIG. 5, at Mach numbers above approximately 0.8 the acoustic treatment has lost much of its effectiveness and the system approximates a purely accelerating inlet. At Mach numbers below approximately 0.7 the effect of acceleration is not extremely significant and other methods may be employed to reduce noise levels. Therefore, the region of primary interest to the application of the present invention is Mach numbers substantially between 0.7 and 0.8. The principle is applicable to lower Mach numbers (Mach numbers as low as 0.6). However, at these low Mach numbers the axial extent of throat would be very small. In fact, the throat could be defined at a singular point of minimum area and would not be based on equation (1) above.

The cylindrical section 58 ahead of the fan blades 15 is lined with sound-absorbent material 60 since this is the region which absorbs the refracted acoustic waves. The length $L_c$ of this section is optimized from an effectiveness versus weight standpoint. Practical considerations dictate that an aircraft-mounted gas turbine engine inlet duct have a length-to-diameter ratio of no more than one. After deducting from this the axial extent of the throat and diffuser sections, the remaining length-to-diameter ratio of the cylindrical section is no greater than 0.2. However, where weight is no limitation, this value may be exceeded since it is well known that the longer the acoustically treated section, the more sound attenuation will be obtained.

As has been previously mentioned, prior attempts to combine the acoustic benefits of sound-absorbent materials and an accelerating inlet have been unsuccessful. Curve C of FIG. 5 represents the locus of test data taken on state-of-the-art accelerating inlets of various types with sound-absorbent material added to the inner duct wall. It is readily apparent that at low Mach numbers such as 0.6, the inlets behave essentially as acoustic material-treated inlets without the benefits of acceleration. However, in the Mach number range of approximately 0.7 to 0.8, the inlets behave as purely accelerating inlets with almost complete loss of sound-absorbent material effectiveness. Thus, the inlet configuration of FIG. 4, sized in accordance with the teachings incorporated herein, and the results of which are graphically depicted as curve B in FIG. 5, is clearly superior to the mere addition of sound-absorbent material to a known accelerating inlet.

The inventive inlet herein described has another benefit in that it makes it possible to use the same inlet noise suppression scheme at engine take-off and approach conditions. At approach conditions where inlet velocities are low compared with the take-off condition, no flow acceleration is needed since the sound-absorbent materials are included. In fact, in this low velocity approach mode, the suppression would be enhanced by incorporating sound-absorbent materials in the diffuser section 56 as well as the cylindrical portion 58 without detriment to the acoustic performance at higher Mach numbers. If no sound-absorbent treatment were employed, then in order to get any acoustic suppression on approach, area variation of the throat would be required to accelerate the flow at the low flow rate and this would result in increased complexity and cost.

Finally, the reduced Mach number requirements of the present inlet (considerably less than 1) will reduce the inlet's susceptibility to destruction of the acoustic suppression caused by inlet distortion. In effect, since part of the suppression comes from increased sound-absorbent treatment effectiveness, the treatment damps the distorting effects of angle of attack variation.

It should be obvious to one skilled in the art that certain changes can be made to the above-described invention without departing from the broad inventive concepts thereof. For example, the invention is not limited to gas turbine engines but may be employed on any noise-producing flow machine. Further, in some aircraft gas turbine engine applications it may be necessary to combine the subject invention with variable exhaust nozzles and even a supplemental variable area inlet duct in order to obtain the desired level of noise suppression. It is intended that the appended claims cover these and all other variations in the present invention's broader inventive concepts.

Having thus described the invention, what is claimed as novel and desired to be secured by Letters Patent of the United States is:

1. In a gas turbine engine of the type having rotatable compression means adapted to pressurize a motive fluid there is provided a sound-attenuating inlet duct comprising:
   causing means open at opposing ends to accommodate the passage of the motive fluid therethrough and defining, in serial flow relationship, a throat of predetermined axial extent, a diffuser and a generally cylindrical section ahead of the compression means; and
   acoustic treatment disposed upon and within said casing means, wherein
   the throat, the diffuser and cylindrical section geometry cause an acceleration of the motive fluid to a higher axial velocity proximate the casing acoustic treatment than proximate the rotational axis to provide sound attenuation by imparting to the acoustic waves propagating through the inlet duct a velocity component normal to the acoustic treatment, the geometry of the throat and the diffuser being substantially defined by the relationships:

$$L_d/D = 2.6 M - 1.12,$$

and $$L_t/D = 1.28 - 1.6 M,$$

wherein
$D$ = diameter of the cylindrical section;
$L_d$ = axial extent of the diffuser;
$L_t$ = axial extent of the throat; and
$M$ = average throat Mach number substantially between 0.7 and 0.8.

2. A sound-attenuating inlet duct for reducing acoustic wave propagation, said inlet duct comprising:
   a casing having an inner surface defining, in part, a motive fluid flow path and open at opposing ends to accommodate the passage of the motive fluid therethrough, the casing defining, in serial flow relationship, a minimum area throat of predetermined axial extent through which the motive fluid is adapted to be accelerated to a high subsonic Mach number thereby providing a first quantum of acoustic attenuation, a relatively rapid diffuser, and a cylindrical section; and
   sound-absorption material disposed upon the casing inner surface defining the diffuser and the cylindrical section; the diffuser and the throat being substantially defined by the relationships:
$$L_d/D = 2.6 M - 1.12,$$

and $$L_t/D = 1.28 - 1.6 M,$$

wherein:
$D$ = diameter of the cylindrical section;
$L_d$ = axial extent of the diffuser;
$L_t$ = axial extent of the throat; and
$M$ = average throat Mach number substantially between 0.7 and 0.8;
whereby the motive fluid is accelerated to a substantially higher axial velocity proximate the sound-absorption material than the axial velocity at the duct longitudinal axis to thereby turn the acoustic waves toward the sound-absorption material resulting in a normal impact of the waves upon the material and the additive second quantum of acoustic attenuation.

3. The sound-attenuating inlet duct of claim 2 wherein the ratio of the axial length of the cylindrical section to the diameter of the cylindrical section is no more than 0.2.

4. A sound-attenuating inlet duct for reducing noise propagating therein, said duct including an inner wall partially defining a fluid flow path having a throat for accelerating the fluid to a high average subsonic Mach number and sound-absorption material disposed along the inlet duct inner wall downstream of the throat, and wherein the inner wall is contoured in such a manner that the flow is rapidly diffused along the inner wall without causing flow separation therefrom and such that the axial velocity proximate the inner wall exceeds that at the inlet centerline, the rapid diffusion causing the acoustic waves within the flow, and propagating in a direction opposite to the flow, to refract toward the sound-absorption material.

5. In a method of attenuating noise propagating along an inlet duct in a direction generally opposite to the fluid flow, the duct having an inner wall partially defining a fluid flow path, the steps of: accelerating the fluid at a throat to a high average subsonic Mach number;

rapidly diffusing the fluid along the inner wall which is contoured in such a manner that flow separation from the inner wall is avoided, the axial velocity of the fluid proximate the inner wall exceeding that at the inlet centerline; and refracting the acoustic waves with the fluid toward sound-absorption material disposed along the inner wall downstream of the throat.

* * * * *